United States Patent [19]
Bandai et al.

[11] Patent Number: 5,519,512
[45] Date of Patent: May 21, 1996

[54] FACSIMILE APPARATUS HAVING REDUCED PROFILE

[75] Inventors: Yasuhito Bandai; Tomohisa Higuchi; Hiroaki Yazawa, all of Nagoya; Yoshikatsu Kameyama; Makoto Yamada, both of Gifu, all of Japan

[73] Assignee: Brother Kogyo Kabushiki Kaisha, Japan

[21] Appl. No.: 275,721

[22] Filed: Jul. 19, 1994

[30]   Foreign Application Priority Data

Nov. 1, 1993  [JP]  Japan .................................. 5-297254

[51] Int. Cl.⁶ ...................................................... H04N 1/12
[52] U.S. Cl. ........................... 358/474; 358/483; 358/498
[58] Field of Search ...................... 358/474, 475, 358/471, 482, 483, 496–498; 346/76 PH; 355/309; 271/220, 264, 265, 161, 188, 273–274; H04N 1/12, 1/03

[56]   References Cited

U.S. PATENT DOCUMENTS

| | | |
|---|---|---|
| 4,199,789 | 4/1980 | Yvard . |
| 4,630,123 | 12/1986 | Kadomatsu ............................ 358/498 |
| 5,077,618 | 12/1991 | Sakai et al. ............................ 358/496 |
| 5,094,660 | 3/1992 | Okuzawa .............................. 271/188 |
| 5,267,058 | 11/1993 | Sata ...................................... 358/496 |
| 5,313,289 | 5/1994 | Nagane et al. ......................... 358/475 |
| 5,346,457 | 9/1994 | Kimura . |
| 5,452,110 | 9/1995 | Hatano et al. .......................... 358/496 |

*Primary Examiner*—Kim Yen Vu
*Attorney, Agent, or Firm*—Oliff & Berridge

[57]   ABSTRACT

A facsimile apparatus includes a light emitting unit disposed downstream in the direction of feed of a document with respect to a normal plane perpendicular to the document surface on a reading line. Outgoing beams for reading travel rearward in a substantially horizontal direction. Incoming beams from the light emitting unit are reflected on the reading line on the document surface and are supplied as the outgoing beams for reading to a light sensing unit. Consequently, it is possible to reduce the height of the front portion of the facsimile apparatus so as to increase a degree of freedom in designing while enhancing reliability in reading the document.

24 Claims, 6 Drawing Sheets

FACSIMILE APPARATUS HAVING REDUCED PROFILE

BACKGROUND OF THE INVENTION

1. Field of the Invention

The present invention relates to a facsimile apparatus and, more particularly, to a facsimile apparatus in which disposition of a light emitting unit for emitting beams on a document is changed and thereby the front portion of the facsimile apparatus is made smaller in height.

2. Description of the Related Art

In the optical system for reading a document in a facsimile apparatus 100 so far in use, there have been provided, as shown in FIG. 6, a light emitting unit 101, a first reflection mirror 103 for changing the direction of outgoing beams B102 for reading, which are incoming beams from the light emitting unit 101 reflected on the surface of the document, a second reflection mirror 104 for inverting the direction of the outgoing beams B102 for reading, and a light sensing unit 105.

The light emitting unit is disposed on a side opposite to the direction of feed of the document with respect to a normal plane perpendicular to the surface of the document on a reading line as a start point of the outgoing beams for reading so that the outgoing beams for reading are emitted from the document surface in substantially the vertical direction.

The reason why the light emitting unit is so disposed, in which the outgoing beams for reading are emitted from the document surface in substantially the vertical direction, is because it is therefore ensured that the document is correctly read even if the position of the document at the reading line is deviated upward or downward from the proper level due to distortion of the document or the like, and also the outgoing beams for reading are intensified, and reliability of the reading is secured.

The outgoing beams for reading suffer a change in their advancing direction at the first reflection mirror and suffer a change in their advancing direction again at the second reflection mirror disposed in the rear of the interior of the body frame, to be introduced into the light sensing unit disposed below the light emitting unit.

The light emitting unit is structured such that the incoming beams emitted from a plurality of light emitting elements enter directly to the document, not via a condenser lens. Further, a document presser for pressing the document downward to a glass plate supporting the document in the vicinity of the reading line is swingably supported by the body frame through pins at the right and left ends, and it is adapted to slightly press the document by its own weight.

There have been such problems with the above described conventional facsimile apparatus in that the first reflection mirror having a large width in the lateral direction has to be installed near the document, it is difficult to incorporate the first reflection mirror with high precision, the front portion of the facsimile apparatus becomes larger in height and difficult to reduce its thickness, the degree of freedom in designing is lower because the light sensing unit is disposed below the light emitting unit, and it is difficult to incorporate the second reflection mirror and the light sensing unit with high accuracy because they are formed independently.

Here, the outgoing beams for reading may be arranged to be emitted at an angle larger than a right angle with respect to the surface of the document. Then, however, such a problem may arise that reliability of the reading is lowered due to the distortion of the document in the reading line.

SUMMARY OF THE INVENTION

An object of the present invention is to provide a facsimile apparatus, of which the front portion is made smaller in height so that the degree of freedom in designing is increased, and also to secure high reliability in reading the document.

According to a first aspect of the invention, there is provided a facsimile apparatus comprising a light emitting unit including a plurality of light emitting elements, a reflection mirror for changing the direction of outgoing beams for reading generated by incoming beams from the light emitting unit reflected on the surface of a document, and a light sensing unit for sensing the outgoing beams for reading reflected by the reflection mirror. The light emitting unit is disposed such that the incoming beams enter in the direction substantially parallel to the plane perpendicular to the surface of the document or in the direction tilted downstream in the direction of feed of the document with respect to the normal plane on the reading line on the surface of the document as a start point of outgoing beams for reading, and also such that the outgoing beams for reading travel toward the light sensing unit in a substantially horizontal direction.

According to a second aspect of the invention, the reflection mirror and the light sensing unit are preferably formed into an integral light sensing unit with a mirror, in which the reflection mirror is disposed right before a focusing lens of the light sensing unit, and the light sensing unit is disposed in the rear of the interior of the body frame of the facsimile apparatus.

According to a third aspect of the invention, the light emitting unit is preferably provided with a condenser lens for condensing the incoming beams into a region including the reading line on the surface of the document and having a predetermined longitudinal width.

According to a fourth aspect of the invention, the facsimile apparatus preferably further comprises a transparent member for supporting the document on the lower side in the vicinity of the reading line on the surface of the document, a document presser member for pressing the document downward against the transparent member, a plurality of elastic members for urging the document presser member toward the transparent member, and an elevatable support mechanism for supporting the document presser member such that the document presser member is movable toward and away from the transparent member in parallel therewith.

According to a fifth aspect of the invention, the facsimile apparatus preferably further comprises a document feed mechanism, including a feed roller and a pinch roller holding the document therebetween in the center of the width of the document, near upstream in the direction of feed of the document beyond the light emitting unit, and collar members each having a plurality of annular ribs substantially the same in diameter as the feed roller, mounted on the roller shaft of the feed roller on both sides of the feed roller.

In the facsimile apparatus in its first aspect, since the light emitting unit is disposed such that the incoming beams enter in the direction substantially parallel to the plane perpendicular to the surface of the document or in the direction tilted downstream in the direction of feed of the document with respect to the normal plane on the reading line on the surface of the document as the start point of the outgoing beams for reading, and also such that the outgoing beams for reading travel toward the light sensing unit in a substantially horizontal direction, the reflection mirror that would otherwise be required right below the document can be dispensed with, and further, the light sensing unit can be disposed in the rear of the interior of the body frame.

Accordingly, such merits can be obtained by the elimination of a reflection mirror that a cost of a reflection mirror itself and a cost for incorporating it can be reduced, the front portion of the facsimile apparatus can be made thinner to improve its design appearance, and the provision of a small and light facsimile apparatus can be achieved.

In the facsimile apparatus in its second aspect, since the reflection mirror for changing the traveling direction of the outgoing beams for reading and the light sensing unit are formed into an integral light sensing unit, and the light sensing unit is disposed in the rear of the interior of the body frame of the facsimile apparatus, incorporating the reflection mirror and the light sensing unit in place can be simplified, and also the height of the front portion of the facsimile apparatus can be made smaller.

In the facsimile apparatus in its third aspect, since the light emitting unit is provided with a condenser lens for condensing the incoming beams into the region including the reading line on the surface of the document and having a predetermined longitudinal width, the brightness in the region over the predetermined width can be increased, and reliability in reading the document can be improved.

In the facsimile apparatus in its fourth aspect, since there are further provided the transparent member for supporting the document on the lower side in the vicinity of the reading line on the surface of the document, a document presser member for pressing the document downward against the transparent member, the plurality of elastic members for urging the document presser member toward the transparent member, and the elevatable support mechanism for supporting the document presser member such that the document presser member is movable toward and away from the transparent member in parallel therewith, the document can always be kept in close contact with the transparent member.

In the facsimile apparatus in its fifth aspect, since there are further provided a document feed mechanism, including a feed roller and a pinch roller holding the document therebetween in the center of the width of the document, near upstream in the direction of feed of the document beyond the light emitting unit, and the collar members each having the plurality of annular ribs substantially the same in diameter as the feed roller, mounted on the roller shaft of the feed roller on both sides of the feed roller, the document can be fed over the whole width in the lateral direction under the same condition, and accordingly, the reading line of the document can be kept straight.

BRIEF DESCRIPTION OF THE DRAWINGS

A preferred embodiment of the present invention will be described in detail with reference to the accompanying drawings, wherein.

DETAILED DESCRIPTION OF PREFERRED EMBODIMENTS

A preferred embodiment of the invention will be described below with reference to the accompanying drawings.

Figure 1:
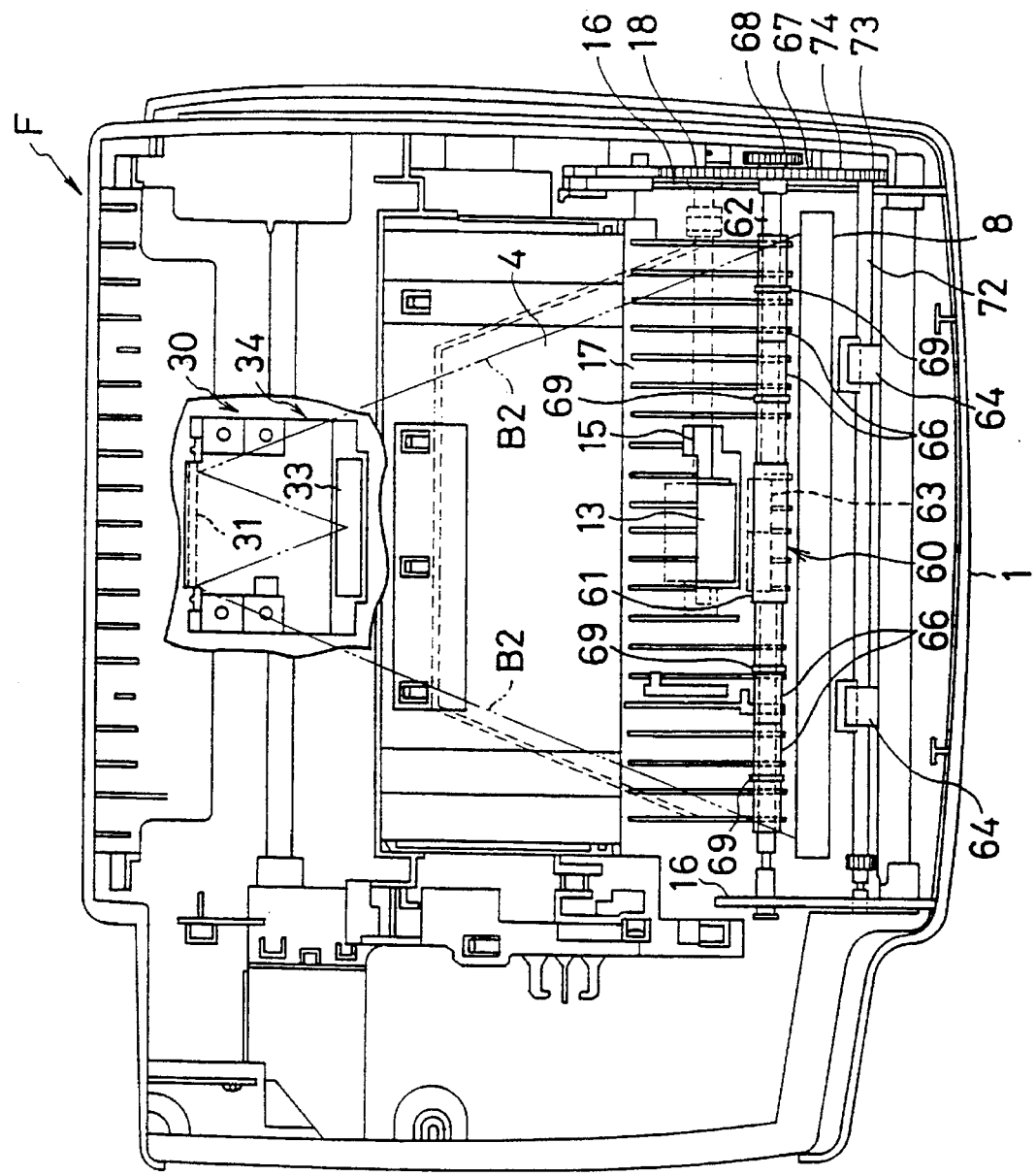
FIG. 1 is a plan view showing the principal components of a facsimile apparatus in a preferred embodiment according to the invention.
Figure 2:
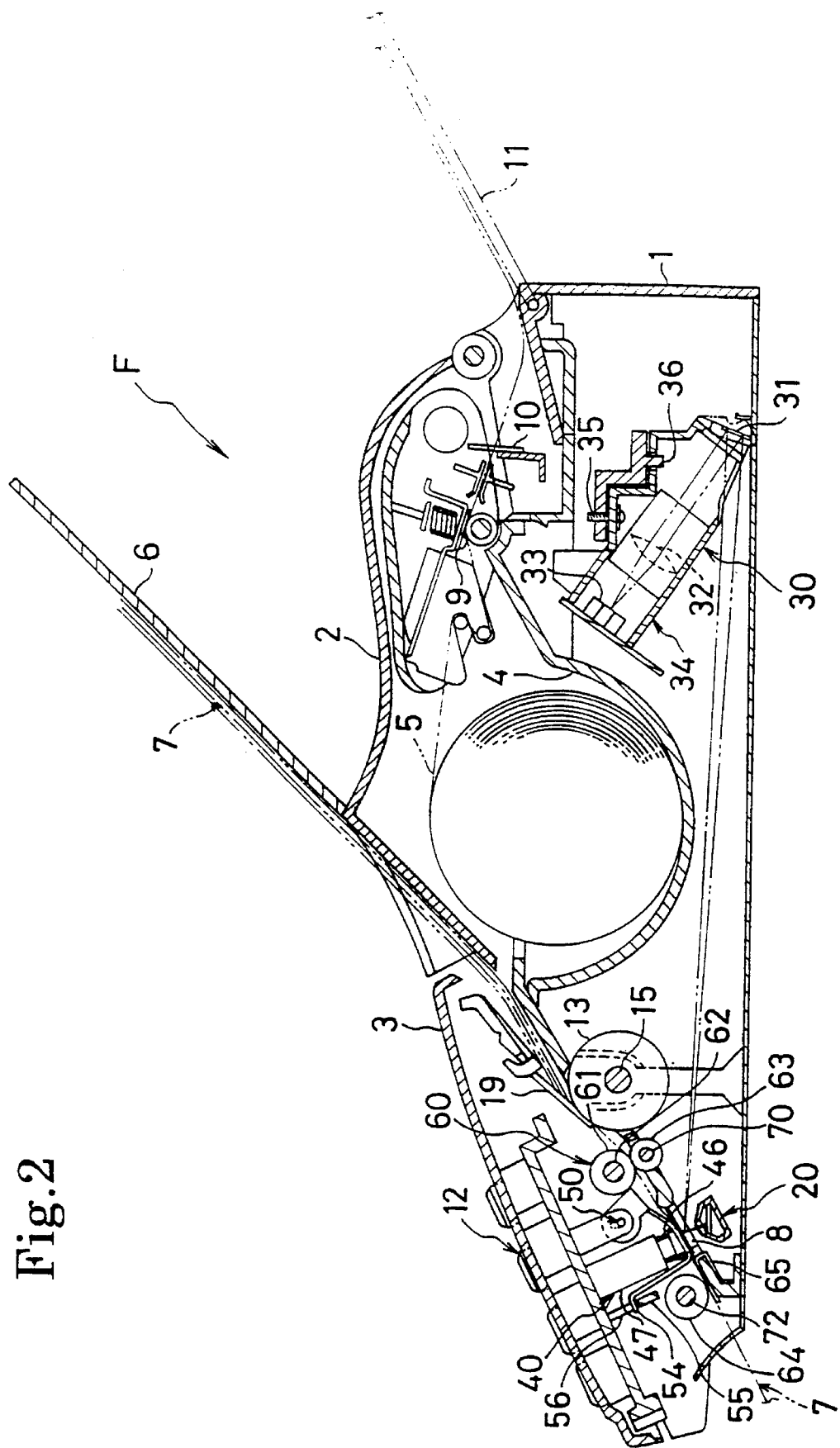
FIG. 2 is a longitudinal side view of the facsimile apparatus of FIG. 1.
Figure 3:
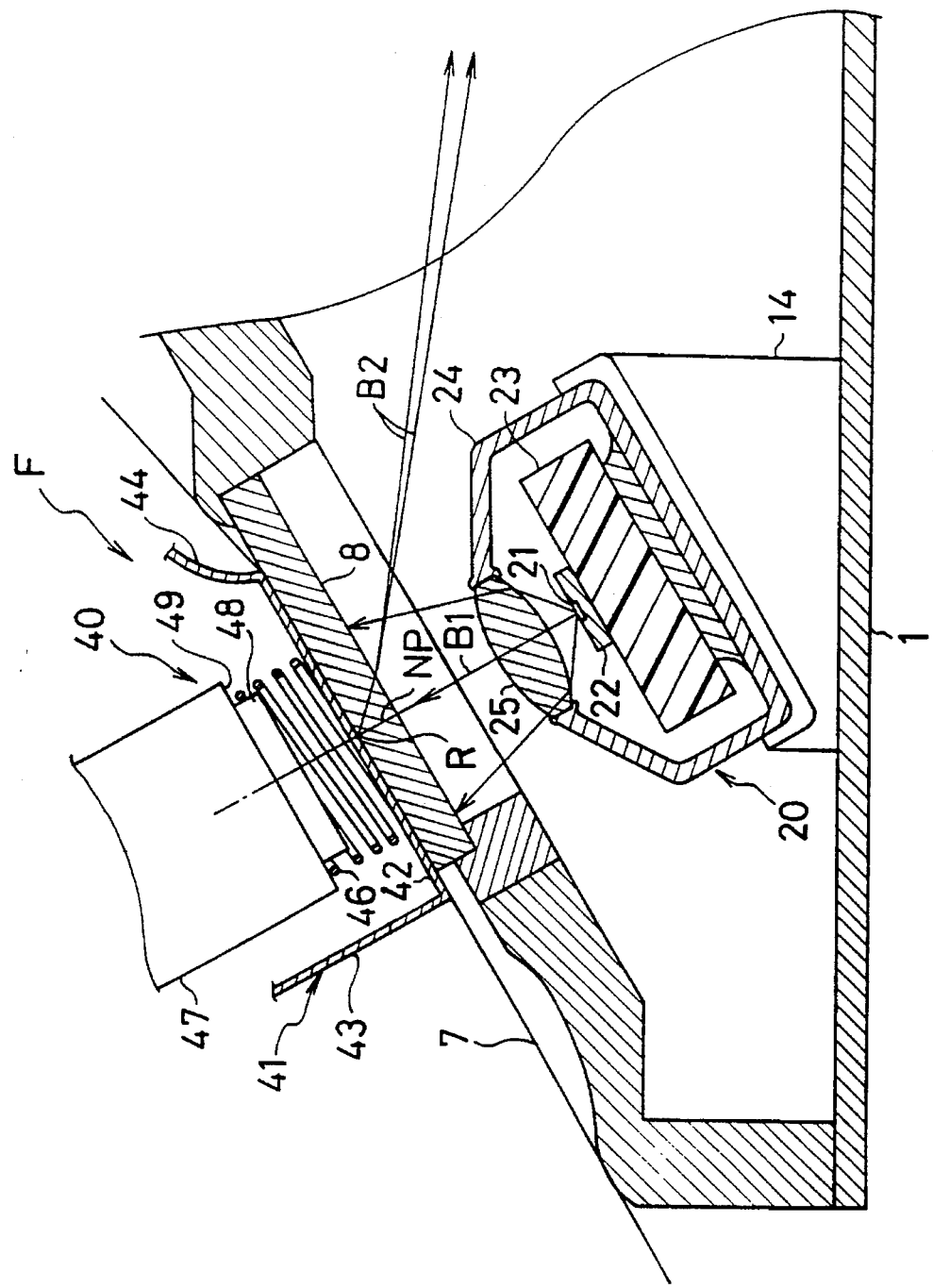
FIG. 3 is an enlarged sectional view showing a light emitting unit and the vicinity thereof in the facsimile apparatus of FIG. 1.

As shown in FIG. 1 to FIG. 3, a facsimile apparatus F comprises a body frame 1, a recording paper cover 2 for openably covering the upper rear portion of the body frame 1, a panel cover 3 for openably covering the upper front portion of the body frame 1, recording paper 5 in a roll contained in a recording paper containing portion 4, a document tray 6, on which a document is set, a separation roller 13 for separating the documents 7 one after another, a light emitting unit 20, a light sensing unit 30 with a reflection mirror, a document feed mechanism 60 for feeding the document 7, a transparent glass plate 8 (corresponding to a transparent member) for supporting the document 7 from below in the vicinity of a reading line R on the document 7, a document pressing mechanism 40 for pressing the document 7 against the glass plate 8, a thermal head 9 for printing the recording paper 5 of a thermal recording type, a cutting edge 10 for cutting the recording paper 5 after printing, a recording paper tray 11 for receiving the cut recording paper 5, a console panel 12 provided on the panel cover 3, and a control unit (not shown) incorporated in the body frame 1.

First, the optical system including the light emitting unit 20, the light sensing unit 30 with a reflection mirror and the like will be described hereunder.

As shown in FIG. 1 to FIG. 3, the light emitting unit 20 includes a light emitting element substrate 22 with a plurality of light emitting diodes 21 arranged at substantially predetermined intervals in the lateral direction, a base plate 23 on which the light emitting element substrate 22 is fixed, a case 24, and a condenser lens 25 for condensing incoming beams B1 from the plurality of light emitting diodes 21. The light emitting unit 20 is formed to be longer than the width of the document 7 and fixedly mounted on a mounting portion 14 in the body frame 1.

The incoming beams B1 from the light emitting unit 20 are reflected on the reading line R on the document 7 and supplied to the light sensing unit 30 as outgoing beams B2 for reading, wherein the light emitting unit 20 is disposed such that the incoming beams B1 enter in a direction parallel to a normal plane NP perpendicular to the surface of the document 7 on the reading line R, and such that the outgoing beams B2 for reading travel backward in a substantially horizontal direction. The document 7 in the position of the reading line R is declined forwardly at about 30°.

Accordingly, the incoming beams B1 from the light emitting unit 20 enter at a right angle with respect to the document 7 and the outgoing beams B2 for reading are emitted with an inclination of about 40° with respect to the normal plane NP in the direction opposite to the direction of feed of the document 7.

Thus, since the outgoing beams B2 for reading reflected on the document 7 travel backward in substantially the horizontal direction, it is possible to dispense with a reflection mirror having a large length in the lateral direction and requiring high incorporating accuracy, with another advantage of reduction in cost for parts and assembling work.

The condenser lens 25 is a slender lens in the form of a bar stretched in the lateral direction and it has a radius of curvature of about 6 mm and a predetermined thickness of about 2.5 mm. This condenser lens 25 is constituted such that the incoming beams B1 from the light emitting unit 20 are converged into the region of about 10 mm in width around the reading line R.

Thus, the incoming beams from the light emitting unit 20 are effectively radiated only in the vicinity of the reading line R of the document 7, and therefore, the outgoing beams B2 for reading can be provided with sufficiently high intensity so that high reliability in reading can be maintained.

The light sensing unit 30 has a reflection mirror 31 for changing the direction of the outgoing beams B2 for reading, a focusing lens 32, and a plurality of photodiodes 33, where the reflection mirror 31 is disposed right before the focusing lens 32.

The reflection mirror 31, focusing lens 32, and plurality of photodiodes 33 are integrated into the light sensing unit 30. The light sensing unit 30 is disposed slantwise in the rear of the interior of the body frame 1, and it is fixedly positioned on a fixing portion in the body frame 1 through two screws 35 and two pins 36, which are formed integrally with the body frame 1.

Since the reflection mirror 31, focusing lens 32, and plurality of photodiodes 33 are integrated into the light sensing unit 30, the accuracy in the positioning of the reflection mirror 31 relative to the focusing lens 32 and plurality of photodiodes 33 is improved. Additionally, not only reliability in reading is improved but also the labor for positioning and fixing the reflection mirror 31 in the body frame 1 can be decreased.

The document pressing mechanism 40 will be described below.

Figure 4:
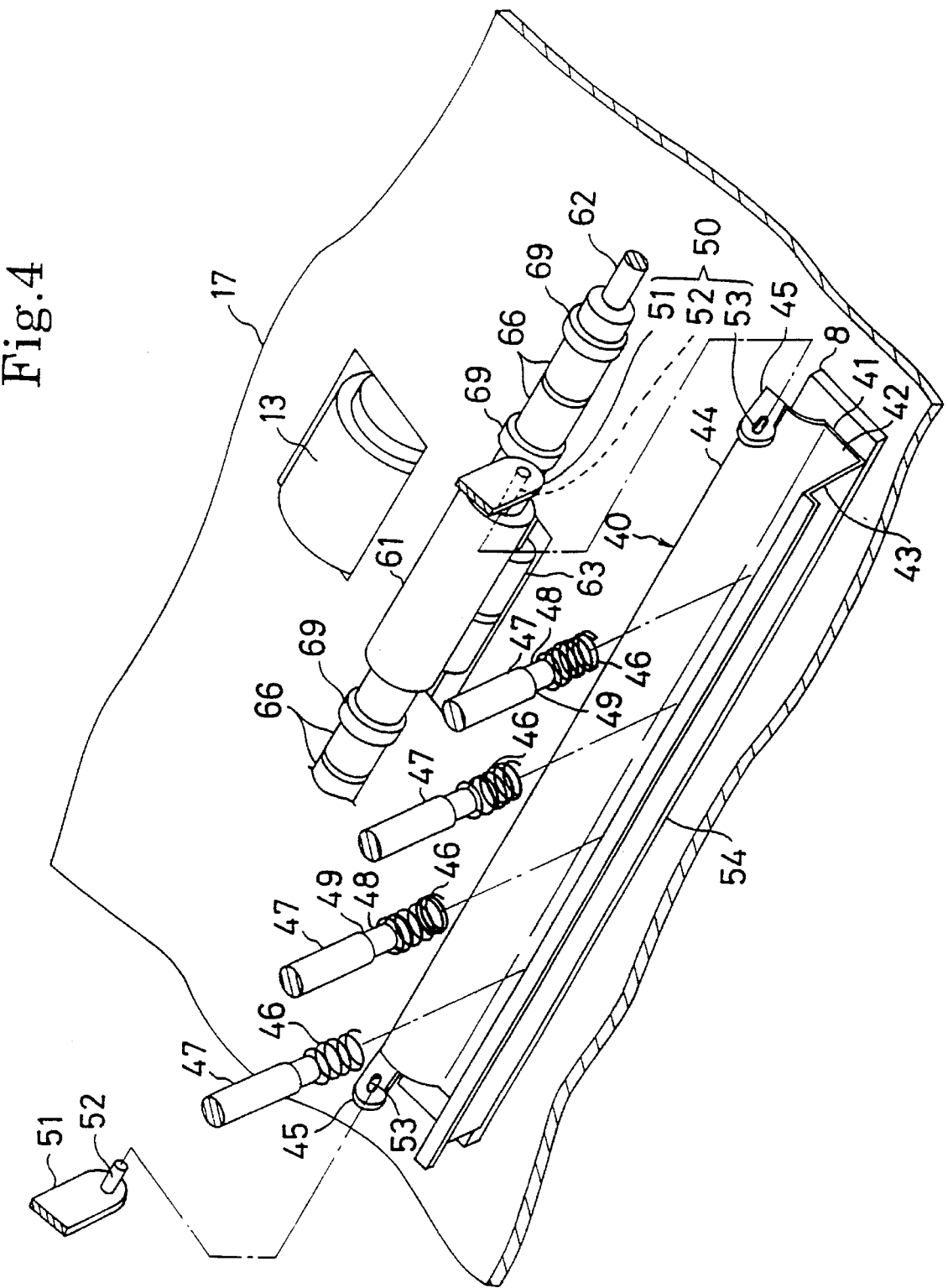
FIG. 4 is a perspective view showing the principal components of a document presser mechanism in the facsimile apparatus of FIG. 1.
Figure 5:
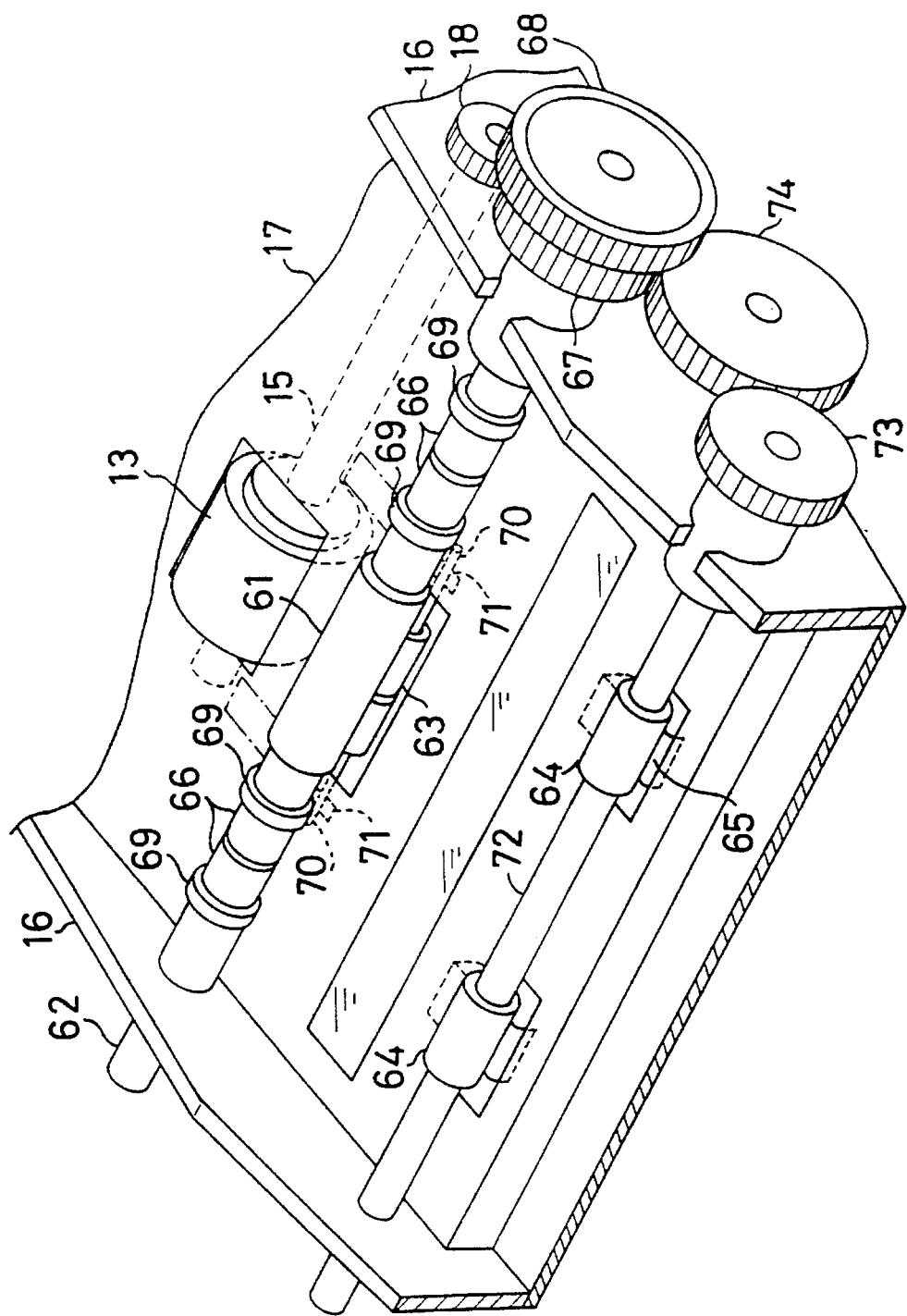
FIG. 5 is a perspective view showing the principal components of a document feed mechanism in the facsimile apparatus of FIG. 1.
Figure 6:
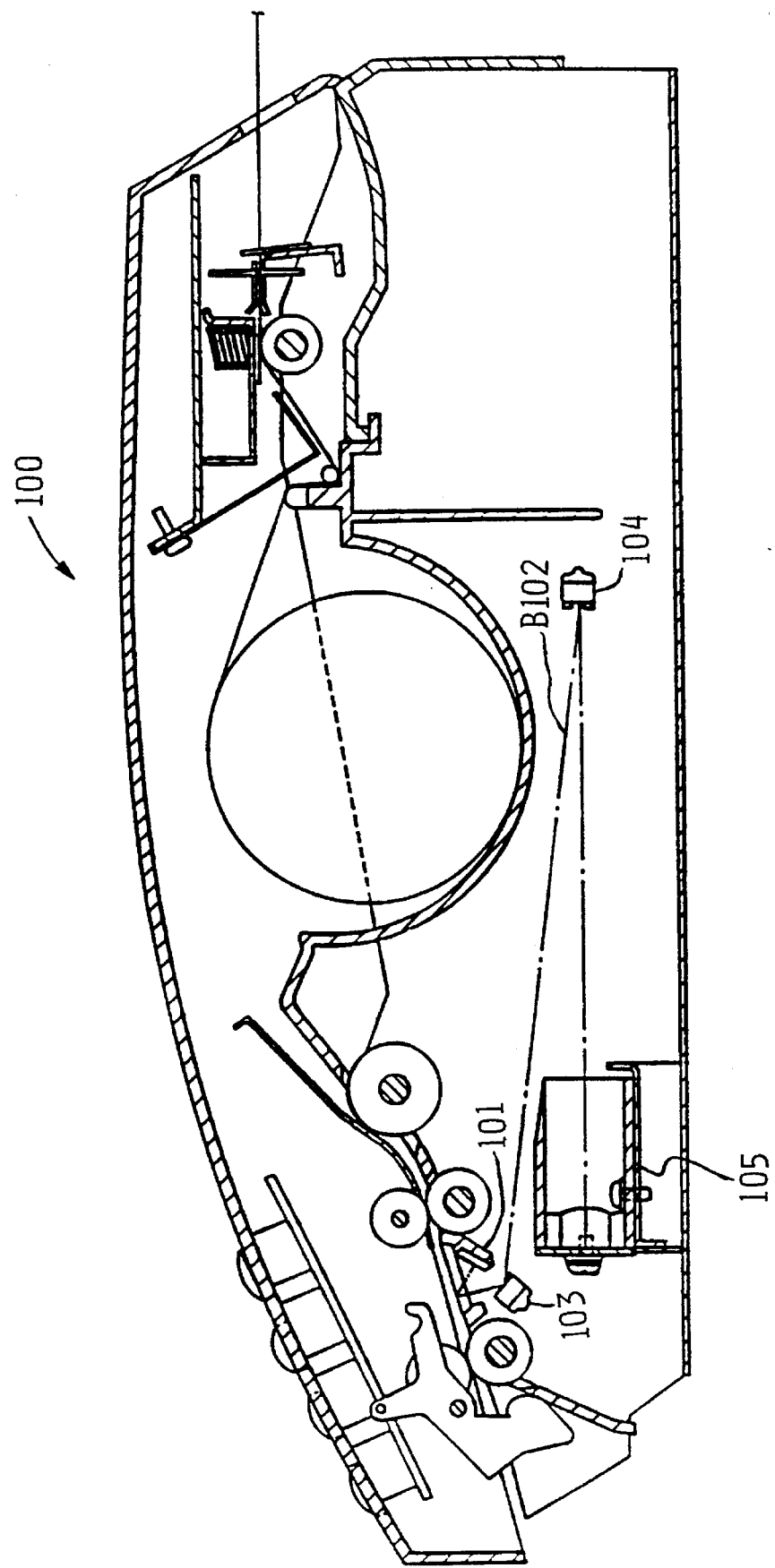
FIG. 6 is a longitudinal side view of a facsimile apparatus in the prior art.

As illustrated in FIGS. 2 through 4, the document pressing mechanism 40 is formed of a document presser 41, four compression coil springs 46 for urging the document presser 41 toward the glass plate 8, and an elevatable support mechanism 50 for supporting the document presser 41 on the panel cover 3 such that the document presser 41 is maintained parallel to and movable toward or away from the glass plate 8. The document presser 41 is made of a thin metallic plate and comprises a bottom plate portion 42, at the lower portion thereof, for bringing the document 7 into contact with the glass plate 8 and having its bottom surface painted white for white level checking; a panel portion 43 rising from the front end of the bottom plate portion 42; a guide plate portion 44 integrally extended from the rear end of the bottom plate portion 42; and a pair of support pieces 45 rising from the right and left ends of the guide plate portion 44.

On the bottom face of the panel cover 3, four rod-shaped spring bearings 47 are projected for supporting the four springs 46. At the end of each spring bearing 47 is formed a stepped smaller-diameter portion 48. Thus, the spring 46 is placed between the step portion 49 at the upper end of the smaller-diameter portion 48 and the bottom plate portion 42.

The elevatable support mechanism 50 will be described below. A pair of right and left support brackets 51 are disposed in the panel cover 3 in the positions corresponding to the right and left support pieces 45. At the lower ends of the support brackets 51 are fixedly provided pins 52 extending toward each other. Each of the support pieces 45 is provided with a slit 53 elongated in the direction perpendicular to the bottom plate portion 42, and the pins 52 are inserted into the slits 53 on the right and left sides.

The upper end portion of the panel plate portion 43 is bent forward so that a hook portion 54 is formed. The hook portion 54 is elevatably engaged with a narrow and long rectangular hole 56 formed sideways in a rib 55 projected on the panel cover 3 (FIG. 2).

With the elevatable support member 50 structured as described above, the document presser 41 is supported on the panel cover 3 such that the bottom plate 42 of the document presser 41 is movable toward and away from the glass plate 8 and maintained parallel thereto.

Since the document presser 41 is resiliently urged toward the glass plate 8 by the four springs 46, the bottom plate portion 42 of the document presser 41 and the glass plate 8 are brought into close contact with each other with the document 7 interposed therebetween. Accordingly, sufficient reliability in reading the document is secured. When the reading is performed without bringing the document 7 into close contact with the glass plate 8, an error in reading may be produced.

The separation roller 13 and the document feed mechanism 60 will be described below with reference to FIGS. 1, 2, 4, and 5.

The separation roller 13 is formed of a rubber roller of a predetermined length of about 35.5 mm and a relatively large diameter of about 20 mm, and it is disposed in the middle of the width of the document and upstream in the direction of feed of the document from the light emitting unit 20. The right-hand end portion of a roller shaft 15 of the separation roller 13 is rotatably supported in the right-hand wall 16 of the body frame 1, and the left-hand end portion thereof is supported by a portion projecting from the rear side of an internal sloped wall 17 of the body frame 1. Further, there is provided a gear 18 on the right-hand end portion of the roller shaft 15 outside the right-hand wall 16. On the upper side of the separation roller 13, an elastic plate 19 is provided for pressing the documents 7 against the separation roller 13. The documents 7 are separated one by one and fed forward from the document tray 6 by means of the separation roller 13 and the elastic plate 19.

The document feed mechanism 60 comprises a feed roller 61 and a feed pinch roller 63 for pressing the document 7 against the feed roller 61, where these rollers are disposed between the separation roller 13 and the glass plate 8 and positioned on the upper and lower sides in the center of the width of the document 7; a pair of right and left delivery rollers 64 disposed upstream of the glass plate 8 and placed on the upper side of the document 7; a pair of right and left leaf springs 65 placed on the lower side of the document 7 for pressing the document 7 against the delivery rollers 64; and a plurality of collars 66 mounted on the roller shaft 62 of the feed roller 61.

The roller shaft 62 of the feed roller 61 is rotatably supported at the right and left end portions thereof by the right and left side walls 16 of the body frame 1. At the right-hand end portion of the roller shaft 62, there are fixed a gear 67 to be meshed with the gear 18 and a knob 68 for manually rotating the roller shaft 62.

On the right-hand and left-hand sides of the feed roller 61, the two collars 66 each preferably made of a synthetic resin are rotatably fitted to the roller shaft 62. Annular ribs 69 having the same diameter as the feed roller 61 are formed integrally with each collar 66.

Since the annular rib 69 is formed so as to have the same diameter as that of the feed roller 61, the upper side of the document 7 is controlled to be in the same plane by the feed roller 61 and the four collars 66, and in such a state, the document 7 is transported between the glass plate 8 and the document presser 41. With the described arrangement, no distortion is produced in the document 7 on the reading line R, and reliability in reading is further secured.

The feed pinch roller 63 is an idling roller not longer than the feed roller 61, and both right and left end portions of the roller shaft 70 are resiliently urged upward by plate spring members 71.

The roller shaft 72 of the delivery rollers 64 is rotatably supported at both end portions thereof by the right and left side walls 16 of the body frame 1, and a gear 73 is fixed to the right end portion of the roller shaft 72. The gear 73 is operatively associated with the gear 67 of the roller shaft 62 of the feed roller 61 through a gear 74 pivotally attached to the side wall 16.

Further, there is provided a document feeding electric motor (not shown) to be controlled by a control unit, and a gear (not shown) of an output shaft of the electric motor is operatively meshed with the gear 18 of the roller shaft 15 of the separation roller 13.

Since all the rollers of the document feed mechanism 60 are supported by the body frame 1, there is no need for the panel cover 3 to bear any roller, and hence, the panel cover 3 is not required to have high rigidity to bear a roller. Accordingly, it has become possible to form the panel cover 3 of a synthetic resin cover that is lower in rigidity and lighter in weight.

Operation of the above described facsimile apparatus F will be described below.

Since the light emitting unit 20 is disposed downstream in the direction of feed of the document with respect to the normal plane NP perpendicular to the surface of the document 7 on the reading line R so that the outgoing beams B2 for reading travel backward in substantially the horizontal direction, it is made possible to dispense with a reflection mirror that would otherwise be required right below the document 7.

Further, since the reflection mirror 31 and the light sensing unit 34 are formed into an integrated light sensing unit 30, which is disposed in the rear of the interior of the body frame 1, the incorporating work of the reflection mirror 31 and the light sensing unit 34 can be simplified, the front portion of the facsimile apparatus F can be made smaller in height, and the design appearance can be improved. Further, since the light sensing unit 34 is disposed slantwise, the height of the rear portion of the facsimile apparatus F can also be reduced.

Since the light emitting unit 20 is provided with the condenser lens 25, it is made possible to increase the brightness in the region over a predetermined width near the reading line and improve reliability in reading the document.

Further, since the document presser 41 is elevatably supported by the elevatable support mechanism 50 and also it is resiliently urged toward the glass plate 8 by the plurality of springs 46, the document 7 can be read while in close contact with the glass plate 8 by means of the document presser 41, thus securing reliability in reading the document.

Since all of the rollers of the document feed mechanism 60 are supported by the body frame 1, the need for the panel cover 3 to support any roller is eliminated, and hence, the need for increasing the rigidity of the panel cover 3 for supporting a roller is eliminated. As a result, it is made possible to construct the panel cover 3 of a synthetic resin cover having low rigidity and light weight.

Further, the knob 68 for manual operation is attached at the end of the roller shaft 62 of the feed roller 61, and the document 7, if put into a jammed state, can be removed by rotating the roller shaft 62 forwardly or reversely by the knob 68.

While, in the above described embodiment, the light emitting unit 20 is disposed such that the incoming beams enter in the direction parallel to the normal plane NP, it is not limited to the described disposition. For example, the incoming beams emitted from the light emitting unit 20 may enter in the direction inclined with respect to the normal plane NP downstream in the direction of feed of the document.

While a preferred embodiment has been described, such description is for illustrative purpose only, and it will be understood that various changes may be made therein to embody the invention without departing from the spirit of the invention.

What is claimed is:

1. A facsimile apparatus comprising, inside of a main frame having an upper half and a lower half, a paper roller; a light emitting unit including a plurality of light emitting elements; a reflection mirror for changing a direction of outgoing beams for reading generated by incoming beams emitted from said light emitting unit and reflected on a document surface; and a light sensing unit for sensing the outgoing beams for reading reflected by said reflection mirror, said light sensing unit being disposed slantwise enabling said reflection mirror to receive said outgoing beams directly, said light emitting unit being disposed such that the incoming beams enter in one of a direction substantially parallel to a normal plane perpendicular to the document surface and in a direction tilted downstream in the direction of feed of the document with respect to the normal plane on the reading line on the document surface as a start point of the outgoing beams for reading, and also such that the outgoing beams for reading travel toward said light sensing unit in a substantially horizontal direction, wherein said light emitting unit and said light sensing unit are disposed in said lower half of said main frame on opposite sides of said paper roller.

2. The facsimile apparatus according to claim 1, wherein said reflection mirror and said light sensing unit are formed into an integral light sensing unit, in which said reflection mirror is disposed directly upstream of a focusing lens of said light sensing unit, said light sensing unit being disposed in a rear portion inside of the main frame of said facsimile apparatus.

3. The facsimile apparatus according to claim 1, wherein said light emitting unit comprises a condenser lens for condensing the incoming beams into a region including the reading line on the surface of the document, said condenser lens having a predetermined longitudinal width.

4. The facsimile apparatus according to claim 1, further comprising a transparent member for supporting the document near the reading line on the document surface, a document presser member for pressing the document against said transparent member, a plurality of elastic members for urging said document presser member toward said transparent member, and an elevatable support mechanism for supporting said document presser member such that said document presser member is movable toward and away from said transparent member parallel thereto.

5. The facsimile apparatus according to claim 1, further comprising a document feed mechanism, including a feed roller and a pinch roller holding the document therebetween in the center of the width of the document, and collar members each having a plurality of annular ribs substantially the same in diameter as the feed roller, said collar members mounted on the roller shaft of said feed roller on both sides of said feed roller.

6. A facsimile apparatus comprising:

a key panel disposed in a front part of a facsimile body frame having an upper half and a lower half, said key panel being designed for inputting data;

a light emitting unit for emitting beams on a document surface, said light emitting unit being disposed under said key panel and within the lower half of the body frame such that the beams enter in one of a direction substantially parallel to a normal plane perpendicular to the document surface and a direction tilted downstream in the direction of feed of the document with respect to the normal plane on a reading line on the document surface as a start point of the beams for reading, said light emitting unit also being disposed such that the beams for reading travel toward a rear of the facsimile apparatus in a substantially horizontal direction;

a printing paper roller disposed in a middle interior of the body frame downstream from said light emitting unit; and a light sensing unit for sensing the beams reflecting on the document surface, said light sensing unit being disposed slantwise in a rear interior of the lower half of the body frame upstream from said printing paper roller, thereby enabling a reflection mirror to receive said beams directly, wherein said light emitting unit and said light sensing unit are disposed on opposite sides of said printing paper roller.

7. The facsimile apparatus as claimed in claim 6, further comprising a first paper path along which the document to be read travels, said first paper path disposed between said key panel and said light emitting unit and declined forward at approximately 30 degrees.

8. The facsimile apparatus as claimed in claim 6, further comprising:

a printing head disposed in a rear of the body frame and above said light sensing unit; and a second paper path disposed rearwardly of said printing paper roller and above said light sensing unit.

9. The facsimile apparatus as claimed in claim 6, wherein said light emitting unit is disposed slantwise.

10. The facsimile apparatus as claimed in claim 6, further comprising a reflection mirror, wherein said light sensing unit is formed integral with said reflection mirror, said reflection mirror being disposed before a focusing lens of said light sensing unit.

11. The facsimile apparatus as claimed in claim 6, wherein said light emitting unit is provided with a condenser lens for condensing the incoming beams into a region including the reading line on the surface of the document, said condenser lens having a predetermined longitudinal width.

12. The facsimile apparatus as claimed in claim 6, further comprising a transparent member for supporting the document on its lower side near the reading line on the document surface, a document presser member for pressing the document against said transparent member, a plurality of elastic members for urging said document presser member toward said transparent member, and an elevatable support mechanism for supporting said document presser member such that said document presser member is movable toward and away from said transparent member parallel thereto.

13. The facsimile apparatus as claimed in claim 6, further comprising a document feed mechanism, including a feed roller and a pinch roller holding the document therebetween in the center of the width of the document, and collar members each having a plurality of annular ribs substantially the same in diameter as the feed roller, said collar members mounted on the roller shaft of said feed roller on both sides of said feed roller.

14. A facsimile apparatus comprising:

light emitting means for emitting beams on a document surface, said light emitting means being disposed in a front interior of a lower half of a facsimile frame body such that beams enter in one of a direction substantially parallel to a normal plane perpendicular to the document surface and a direction tilted downstream in a document feed direction with respect to the normal plane on a reading line on the document surface as a start point of the beams for reading, said light emitting means also disposed such that the beams for reading travel toward a rear of the facsimile apparatus in a substantially horizontal direction; and light sensing means for sensing the beams reflecting on the document surface, said light sensing means being disposed slantwise in a rear interior of the lower half of the body frame, thereby enabling a reflection mirror to receive said beams directly, wherein said light emitting means and said light sensing means are disposed on opposite sides of a printing paper roller.

15. The facsimile apparatus as claimed in claim 14, further comprising:

key input means for inputting data disposed in the front interior of the frame body and above said light emitting means; and the printing paper roller disposed in a middle interior of the body frame and upstream from said light emitting means.

16. The facsimile apparatus as claimed in claim 14, further comprising a first paper path along which the document to be read travels, said first paper path disposed between said key panel and said light emitting unit and declined forward at approximately 30 degrees.

17. The facsimile apparatus as claimed in claim 14, further comprising:

printing means disposed in a rear of the body frame and above said light sensing unit; and a second paper path disposed rearwardly of said printing paper roller and above said light sensing unit.

18. A facsimile apparatus having a front part and a rear part of an interior of a facsimile body frame having an upper half and a lower half in which the front part and rear part are separated by a printing paper roller storing space, the facsimile apparatus comprising:

key inputting means for inputting data, said key inputting means being disposed in said front part of the body frame;

light emitting means for emitting beams on the surface of a document, said light emitting means being disposed in said front part of the lower half of the body frame such that the beams enter in one of a direction substantially parallel to a normal plane perpendicular to a surface of the document and a direction tilted downstream in the direction of feed of the document with respect to the normal plane on a reading line on the document surface as a start point of the beams for reading, said light emitting means also being disposed such that the beams for reading travel toward a rear of the facsimile apparatus in a substantially horizontal direction; and light sensing means for sensing the beams reflecting on the document surface, said light sensing means being disposed slantwise in said back part of the lower half of the body frame and upstream from a printing paper roller, thereby enabling a reflection mirror to receive said beams directly.

19. The facsimile apparatus as claimed in claim 18, wherein the printing paper roller is disposed in said printing paper roller storing space and upstream from said light emitting means, the facsimile apparatus further comprising:

a first paper path along which the document to be read travels, said first paper path disposed between said key inputting means and said light emitting means;

printing means disposed in the rear part of the body frame and above said light sensing means; and a second paper path disposed rearwardly of said printing paper roller and above said light sensing unit.

20. The facsimile apparatus as claimed in claim 19, wherein said light emitting unit is disposed slantwise and said first paper path is declined forwardly at approximately 30 degrees.

21. The facsimile apparatus as claimed in claim 18, further comprising reflection means, wherein said light sensing means is formed integral with said reflection means, said reflection means being disposed before a focusing lens of said light sensing means.

22. The facsimile apparatus as claimed in claim 18, wherein said light emitting means is provided with a condenser lens for condensing the incoming beams into a region including the reading line on the surface of the document, said condenser lens having a predetermined longitudinal width.

23. The facsimile apparatus as claimed in claim 18, further comprising transparent means for supporting the document on its lower side near the reading line on the document surface, a document presser means for pressing the document against said transparent means, a plurality of elastic means for urging said document presser means toward said transparent means, and an elevatable support means for supporting said document presser means such that said document presser means is movable toward and away from said transparent means parallel thereto.

24. The facsimile apparatus as claimed in claim 18, further comprising document feed means, including a feed roller and a pinch roller holding the document therebetween in the center of the width of the document, and collar members each having a plurality of annular ribs substantially the same in diameter as the feed roller, said collar members mounted on the roller shaft of said feed roller on both sides of said feed roller.

* * * * *